United States Patent [19]

Siegel et al.

[11] Patent Number: 5,609,306

[45] Date of Patent: Mar. 11, 1997

[54] EDUCTOR LINER ARTICLE AND METHOD OF USE

[75] Inventors: Larry D. Siegel, Fairport; Robert R. Heim, East Rochester, both of N.Y.

[73] Assignee: Xerox Corporation, Stamford, Conn.

[21] Appl. No.: 327,734

[22] Filed: Oct. 24, 1994

[51] Int. Cl.⁶ ........................................ B05B 1/00
[52] U.S. Cl. ............................ 239/591; 193/25 R
[58] Field of Search ........................ 239/591, 107, 239/533.13, DIG. 12, 602; 222/460, 461, 570, 566, DIG. 1; 141/331, 332, 364; 355/260, 215, 245; 406/194; 138/44, 114, 109, 37, 98; 193/25, 25 C, 3

[56] References Cited

U.S. PATENT DOCUMENTS

| | | | |
|---|---|---|---|
| 2,776,674 | 1/1957 | Stout | 239/591 |
| 2,781,058 | 2/1957 | Warhus | 239/533.14 |
| 3,194,013 | 7/1965 | Dagneau et al. | 239/591 |
| 3,698,646 | 10/1972 | Robba et al. | 239/591 |
| 3,794,386 | 2/1974 | Hite | 239/590.5 |
| 4,605,225 | 8/1986 | Zimmermann | 239/591 |
| 4,750,602 | 6/1988 | Souda | 193/25 C |
| 4,889,219 | 12/1989 | Key | 193/25 R |
| 5,105,997 | 4/1992 | Wakabayashi et al. | 239/DIG. 12 |
| 5,117,878 | 6/1992 | Shaw et al. | 141/364 |
| 5,123,542 | 6/1992 | Hoppe | 193/331 |
| 5,148,223 | 9/1992 | Cipolla | 355/260 |
| 5,280,324 | 1/1994 | Ono et al. | 355/260 |
| 5,309,961 | 5/1994 | Franke et al. | 239/DIG. 12 |
| 5,394,910 | 3/1995 | Sweetland | 141/331 |
| 5,405,089 | 4/1995 | Heimann et al. | 239/533.14 |

FOREIGN PATENT DOCUMENTS 3602921  8/1987  Germany ........................ 239/591

*Primary Examiner*—Andres Kashnikow
*Assistant Examiner*—Lisa Ann Douglas
*Attorney, Agent, or Firm*—John L. Haack

[57] ABSTRACT

An eductor liner article comprising: a flexible and substantially cylindrically shaped sleeve member with upstream and downstream ends; and a flange collar member adjacent and perpendicularly attached at an internal edge or surface to the up stream end of the sleeve member, wherein the flange collar member anchors the liner in an eductor joint, and wherein the liner eliminates or substantially reduces the deposition and accumulation of particulate material contained in a process stream educing through an eductor member in the vicinity of the eductor joint.

14 Claims, 4 Drawing Sheets

EDUCTOR LINER ARTICLE AND METHOD OF USE

BACKGROUND OF THE INVENTION

The present invention relates to an article for preventing deposition and accumulation of particulate matter or materials contained in a particulate process stream educing through an eductor member, and more particularly, to a toner particle anti-fouling article for use in toner particle processing and handling equipment having vertical or horizontal eductor transport means.

It is known to use vertical and horizontal eductor transport means for the transport and handling of particulate materials, for example, as used in the transport, size reduction, classification, and the addition of additives in the manufacture of toner particles. A problem associated with eductor transport means for handling particulate materials is the deposition and accumulation of particulate matter within the eductor, and in particular, in the vicinity of an eductor assembly join or joint. The deposition and accumulation of particulate material in eductors can result in decreased particle flow rates, changes in composition, and changes in particle size distribution properties of the educing particulate material. Excessive accumulation of deposits may require terminating the process stream and operation, for the purpose subsequent cleaning, and which cleaning is costly and counter-productive.

The following patents may be of interest as background to the present invention.

U.S. Pat. No. 5,148,223, to Cipolla issued Sep. 15, 1992, discloses a developer dispenser that has a substantially enclosed rigid housing with a side wall and a pair of end walls, an opening in the side wall, and a flexible developer mover disposed within the housing. The developer mover has one edge pivotably secured to the side wall, a second edge in sliding contact with the side wall, one surface facing the side wall and the other surface facing the opening and engaging the developer in the housing. The developer mover bends flexibly about an axis parallel to the side wall to move the surface facing the side wall toward the wall and away from the opening. When developer is contained in the housing between the developer mover and opening, the weight of the developer deflects the developer mover away from the opening. In turn, the developer mover resiliently urges the developer toward the opening.

U.S. Pat. No. 5,280,324 to Ono et al., issued Jan. 18, 1994, discloses a detachable toner cartridge for use in an electrophotographic printer which includes an outer cylinder and an inner cylinder contacting each other and having respective toner discharge outlets that can be overlapped with each other by turning the inner cylinder relative to the outer cylinder so as to discharge toner. The inner cylinder is pressed against the outer cylinder in the circumferential direction to bring the cylinders into close contact to prevent toner leakage. The toner cartridge does not require high accuracy in the manufacture thereof.

The aforementioned patents and publications are incorporated by reference herein in their entirety.

The present invention provides in embodiments a solution to the related problems of particulate accumulations or buildup within tubular or eductor transport means and the accompanying negative productivity impacts. The prior art apparently does not address and solve the aforementioned problems as in the present invention by employing a passive resilient liner article.

SUMMARY OF THE INVENTION

It is an object of the present invention to provide an eductor liner article for use in particulate processing and transport equipment, in particular, for toner particle or developer additive handling, that overcomes the disadvantages of operating an eductor transport means in the absence of said eductor liner article.

It is another object of the present invention to provide an eductor liner article that effectively prevents, for example, developer particulate additive materials or toner particle deposition and accumulation on the walls of an eductor in the vicinity of a powder process stream eductor joint.

Another object of the present invention is to provide a method of preventing accumulation or bridging of particulate material educing within an eductor.

These and other objects of the present invention are achieved by providing an eductor liner article comprising a resilient, flexible, and substantially cylindrical, conical, or combination cylindrical and conical shaped sleeve member with upstream and downstream ends and a flange collar member adjacent and perpendicularly attached at an internal edge or surface to the upstream end of said sleeve member, wherein the flange collar member can be used to effectively anchor the liner article within an eductor joint thereby avoiding or eliminating additional fastening or fixing means, and wherein the eductor liner eliminates or substantially reduces the deposition and accumulation of particulate material contained in a powder or particulate process stream educing through the eductor member in the vicinity of the eductor joint.

In embodiments of the present invention there are provided an eductor liner article wherein the aforementioned sleeve member is truncated in the process flow direction of particulate material so that the aperture of the eductor liner article opening in the upstream direction has a larger diameter than the aperture or opening of the eductor liner article in the downstream direction.

In embodiments, the aperture or diameter of the eductor sleeve at the upstream and the downstream ends are concentric about an axis of a cylinder or a cone defined by the cavity of the eductor pipe.

In other embodiments, the aperture of the eductor sleeve at the upstream end is concentric about the long axis of a cylinder defined by the cavity of the eductor member and the aperture of the sleeve at the downstream end is acentric or eccentric from the axis defined by the eductor cavity.

The eductor liner article of the present invention can be fabricated in a variety of geometries. The eductor liner article may be fabricated with a wide range of walls thicknesses and length to diameter aspect ratios. The eductor liner article can be fabricated from any suitable durable deformable and resilient material, for example, a thermoset or thermoplastic rubber or elastomer material, and mixtures thereof. The eductor liner article is preferably deformable by the action of the particulate material contained in the process stream, and is completely or substantially recoverable upon partial or complete removal of the action of the particulate process stream. The eductor liner article is constructed from materials and has dimensions which permit the article to have high dimensional stability over extended periods of use, for example, in excess of 3 years of continuous use.

In accordance with another aspect of the invention, the eductor liner article may further include an internal filler or surface overcoating, and which filler or coating provides enhanced performance properties as described and illustrated herein.

In accordance with still another aspect of the present invention, there is provided a method for preventing accumulation or bridging of particulate material, for example, toner particles, educing within an eductor, the method including inserting a resilient and flexible eductor liner article in a joint region of a powder or solid particulate eductor, the eductor liner including a flexible substantially truncated cylindrical or conical sleeve member having a flange collar member adjacent and perpendicularly attached at an internal edge or surface, of the upstream end of the sleeve member, wherein the flange or collar member fixes liner article within the eductor. With the eductor liner article thus installed in an eductor, the deposition or accumulation of educing particulate material or powder at the eductor joint as well as the eductor walls in the up and downstream vicinities proximate to the eductor liner article is eliminated or substantially reduced.

In accordance with still another aspect of the present invention, there is provided as a result of the aforementioned method, particle flow rates, particle compositions, and particle size distribution properties of the educing particulate materials that are substantially maintained at essentially constant levels as measured before (upstream) and after (downstream) the location of the eductor liner article.

DETAILED DESCRIPTION OF THE INVENTION

The present invention provides in embodiments, an article for reducing or eliminating the deposition of particulate material in a process stream for use in an eductor member in the vicinity of an eductor joint, the article comprising: a flexible and substantially cylindrically and/or conically shaped sleeve member with upstream and downstream ends, the sleeve defining an aperture therethrough; and a flange collar attached and perpendicular to the upstream end of the sleeve, wherein the flange collar anchors the article in the eductor joint, and wherein the article eliminates or substantially reduces the deposition and accumulation of the particulate material contained in the process stream educing through the eductor member in the vicinity of the eductor joint.

Figure 1:
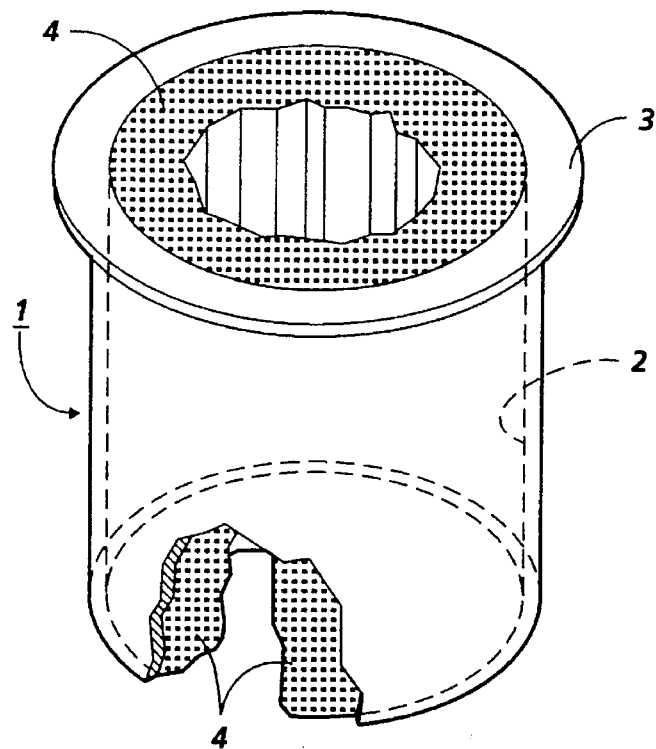
FIG. 1 is a perspective view partially in section of a section of a working eductor or pipe segment in the absence of the resilient flexible eductor liner article of the present invention.

Referring to FIG. 1, as discussed above, a conventional eductor or pipe segment 1 having internal void or cavity 2 and integral flange or collar 3 for joining or connecting with fasteners or clamping means the eductor segment with another matching or mating eductor segment may frequently become fouled by the deposition and excessive accumulation of educing particulate material 4 on the walls of the eductor, particularly when an eductor join or joint region as defined by the flange or collar 3 is butted to or juxaposed with a second eductor segment (not shown).

Although not desired to be limited by theory, it is believed that particulate accumulation and deposition in the joint region of the eductor is promoted by the presence of an internal seam or joint gap in the region where two eductor segments are joined thereby providing a site for particulate material initially sticking or adhering to the internal edge or region of the eductor, and also providing a nucleation site for continuous compounding or successive deposition and accumulation of additional particulate matter on top of already established particulate deposits. The present invention provides a flange collar or seam filler which effectively fills joint gaps thereby minimizing deposition site surface area. A resilient and flexible sleeve member attached to the flange collar provides a passive or self vibrating surface to further prevent and/or liberate any incipient deposits.

Figure 2:
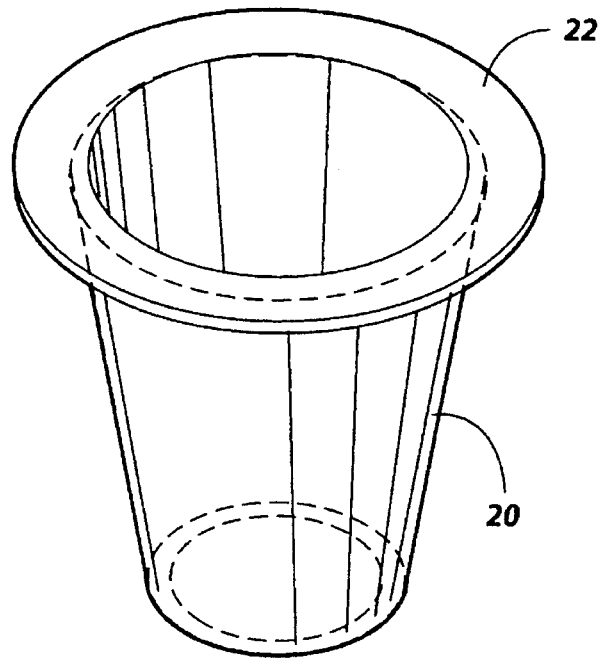
FIG. 2 illustrates, in embodiments, a perspective view of a resilient, flexible, and tapered eductor liner article of the present invention.
Figure 3:
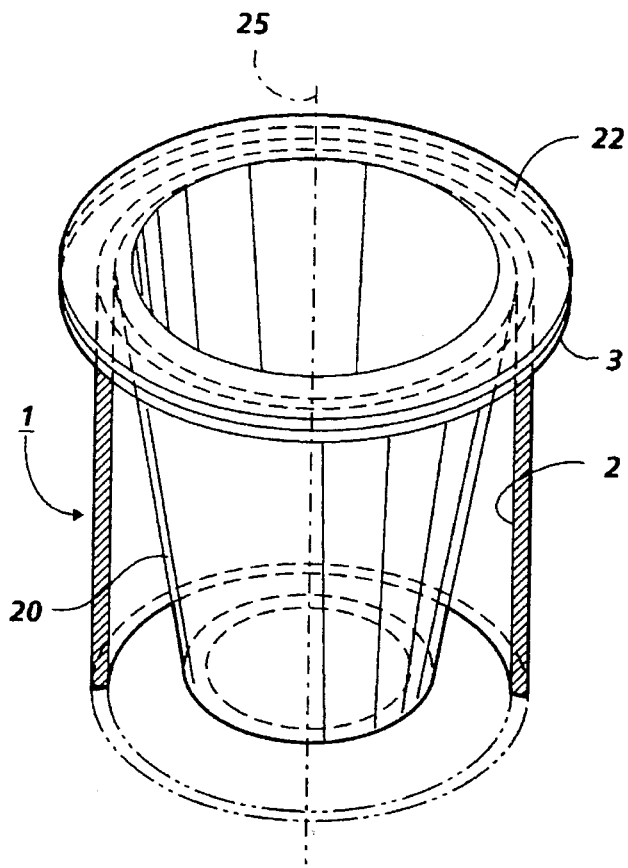
FIG. 3 illustrates, in embodiments, a perspective view partially in section of the working eductor or pipe segment in the presence of the resilient, flexible, and tapered eductor liner member of the present invention.

The eductor liner article in accordance with the present invention includes a sleeve member 20 which is integrally attached to a liner flange or collar member 22, reference FIG. 2. The eductor liner articles of the present invention are preferably fabricated and selected such that the eductor liner article may be easily placed and snugly accommodated within an eductor joint region and thereafter firmly fixed into position by joining an adjacent eductor member article by appropriate means, for example, clamping. FIG. 3 illustrates, in embodiments, an eductor liner article 20 accommodated within an eductor member or pipe indicated by reference numeral 1. The eductor liner article is positioned within the eductor pipe by partially or completely matching or overlapping the eductor liner collar 22 outer diameter with eductor pipe flange 3. The eductor liner articles may possess a coaxial relationship with the axis, for example, axis 25, established by the eductor pipe cylinder geometry.

Figure 4:
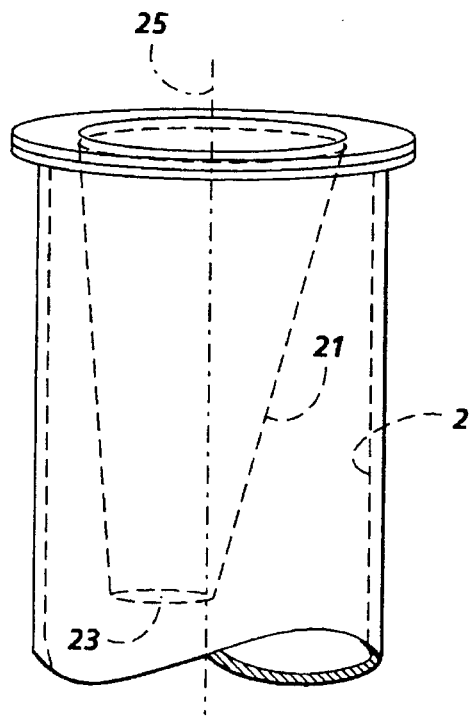
FIG. 4 illustrates a perspective view of an alternative embodiment of the working eductor in the presence of the resilient, flexible, and tapered eductor liner article, wherein the tapered sleeve of the eductor liner article has an acentric or eccentric, or off-axis, opening or aperture on the downstream end of the article.

In an alternative embodiment, an eductor liner article with a truncated long-dimension 21 has a downstream opening 23 which is acentric or eccentric from axis 25 as defined by the internal cylindrical wall or cavity void 2 of the eductor pipe as shown in FIG. 4.

Figure 5:
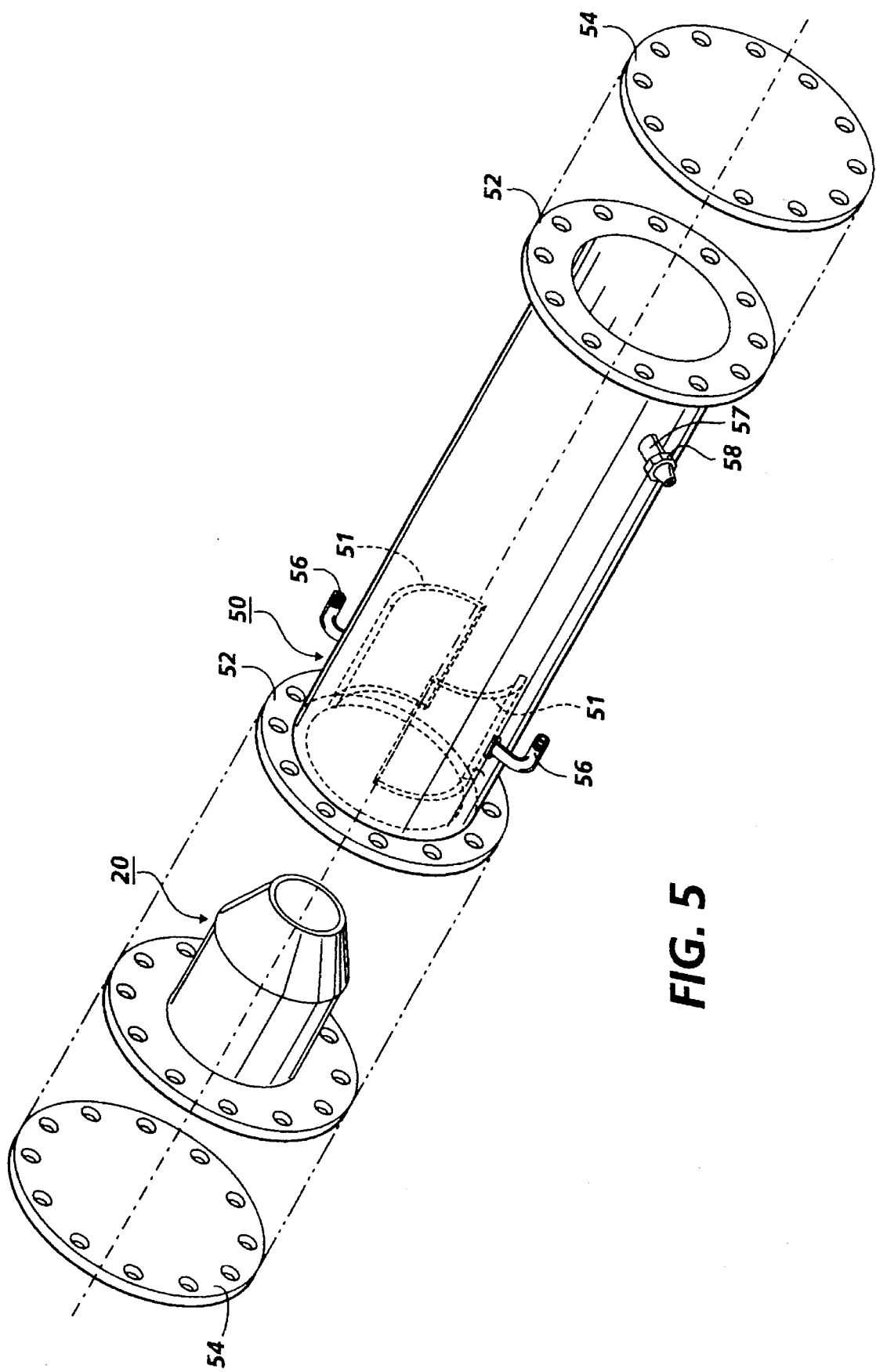
FIG. 5 illustrates, in embodiments, an exploded perspective view of an eductor segment that has been modified for use in either roll mill material flow and adhesion evaluations, or for in-line process simulations.

FIG. 5 illustrates an exploded assembly and perspective view of an eductor transport test apparatus 50 which has been appropriately modified for the purposes of evaluating various eductor liner member 20 material types and geometrical configurations. The cylindrical test apparatus 50 possesses, in embodiments, optional baffle plates 51 on opposite sides of the eductor for the purpose of diverting entering fluidized particles; flanges 52 on the ends of the eductor for sealing the eductor with flange plates or covers 54 and simultaneously fastening eductor liner article 20 into a functional position within the eductor segment at an upstream location. The test apparatus may be used to evaluate liner samples, power flow and deposition properties on a roll mill by affixing an eductor liner article as shown, charging with powder, completely sealing, and thereafter roll milling the assembly for prescribed periods.

Alternatively, the test apparatus may be used in a simulated dynamic mode wherein the apparatus 50 is again fitted with a liner sample 20, the ends are sealed with flange plates 54 and thereafter a fluidized powder sample stream is continuously introduced into and released from the test apparatus via air inlet ports 56 and air outlets 57, respectively. The powder pressure and flow may be regulated and measured by values and gauges connected to either the air inlets or outlets, for example release valve 58.

Figure 6:
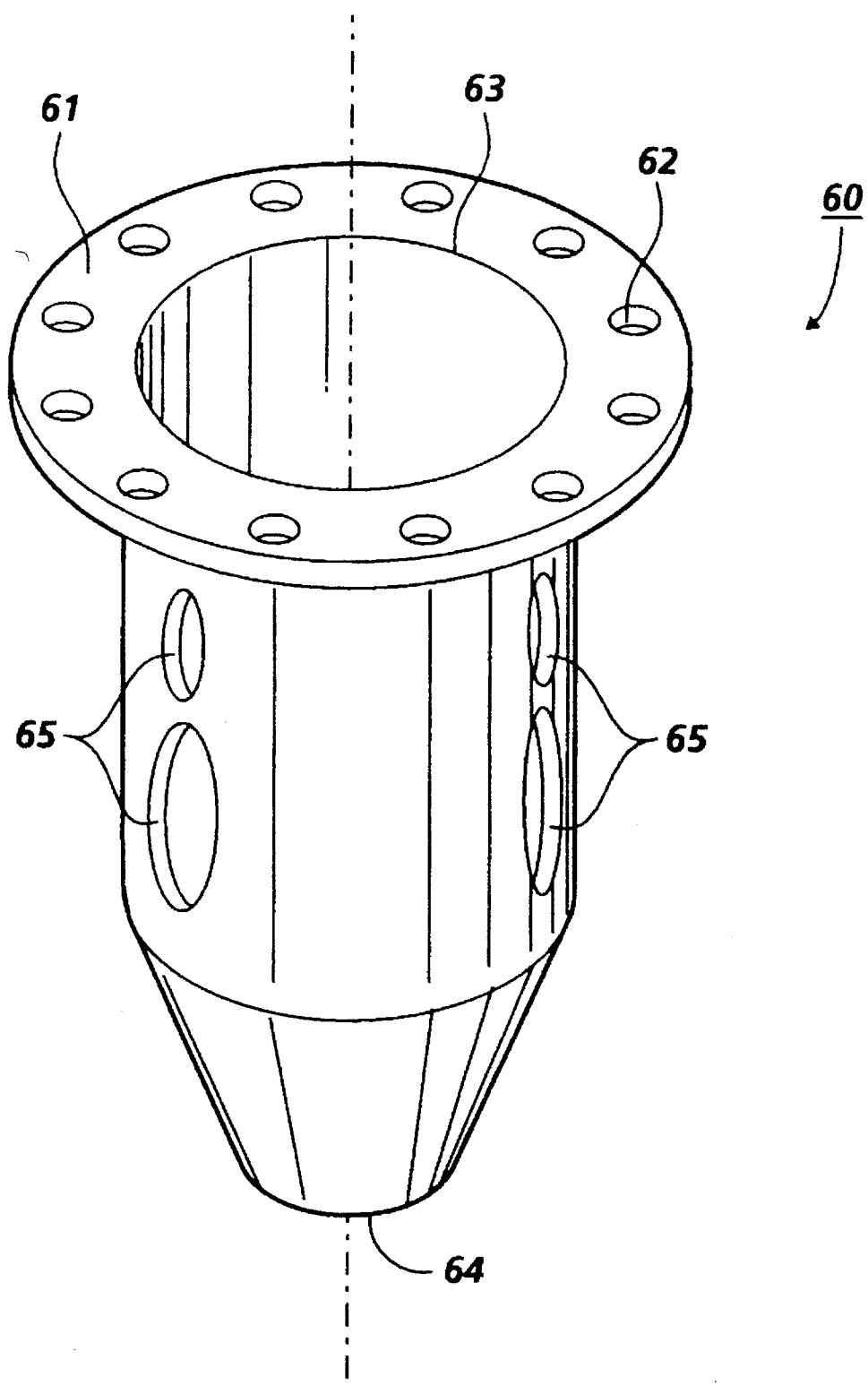
FIG. 6 illustrates, in embodiments, a perspective view of a resilient, flexible, and partially tapered eductor liner article possessing optional side wall openings, optional flange gasket openings for fastening, and a combination cylindrical and conical side wall sleeve geometrical configuration.

The eductor liner article 60 shown in FIG. 6 embodies an alternative geometry which has flange 61 for mounting in a flange joint of an eductor, optional holes 62 for affixing to the eductor member with, for example, screw type fasteners and the like, inner wall 63 which preferably has an internal diameter which is substantially the same as the internal diameter of the eductor member while still providing for a suitably durable and functional wall thickness for the liner 60. Thus, the wall thickness of the eductor liner article may be any dimension so that the objects of the present invention are achieved. That is, the wall thickness and dimensions should be thick enough to minimize the use of unnecessary material, but thick enough to provide durability and longevity, particularly in, highly abrasive or adherent powder flow process streams. The optional side wall holes or orifices 65 provide additional means for regulating the material flow pattern and efficiency of the eductor liner article under different particulate material types, flow regimes, and conditions. A large variety of hole configurations or perforation patterns may be employed to optimize particle flow and to prolong continuous operation free from deposition fouling.

Although not wanting to be limited by theory, it is believed that the eductor liner article in embodiments of the present invention prevents or minimizes the deposition and accumulation of particulate materials by way of the passive action and force imparted by the flow of particulate material upon the resilient, deformable sleeve member, and which deformation and rapid recovery of the sleeve provides sufficient mechanical action to dislodge or to prevent the subsequent deposition or lodging of particulate material on the sleeve member or in the immediate vicinity of the sleeve member.

The present invention is useful in preventing the accumulation or deposition of particulate material in a variety of particulate flow process streams including, for example, particulate and powder materials such as pigments, metal oxide powders, waxes, antistatic compounds, charge control additives, resin and resin blends, and mixtures thereof. Other particulate and powder materials include foodstuffs, such as flour, corn starch, powdered milk, chemicals such as talc, powdered pharmaceutical dosage forms, and the like.

The effective particle size range of particulate and powdered materials which are effectively precluded from depositing or accumulating in an eductor or eductor joint region is from about 10 nanometers, for example fumed silica particles, to about 10,000 microns, for example composite particles and bulk powders such as table salt and sugar.

In embodiments, the liner article has a sleeve member that is truncated in the process flow direction so that the aperture of the sleeve at the upstream end has a larger diameter than the aperture of the sleeve at the downstream end.

In another embodiment, the liner article has apertures of the sleeve member at the upstream and downstream ends that are concentric about the axis of a cylinder or a cone defined by the eductor member cavity.

In other embodiments, the aperture of the sleeve at the upstream end is concentric about the axis of a cylinder defined by the eductor member and the aperture of the sleeve member at the downstream end that is acentric or eccentric from the axis defined by the eductor member.

The size of the eductor member may be any diameter dimension which effectively enables the transport of particulate material under the influence of gravity or under pressure. The effective size of the eductor liner is any dimension which permits the particulate material or process stream to flow at rates which are substantially the same or comparable to the flow rates in the absence of both deposition and an eductor liner article.

In a preferred embodiment, the external diameter of the aperture of the eductor liner sleeve member at the upstream end is substantially the same size as the internal diameter of the eductor, and the diameter of the aperture of the sleeve member at the downstream end is from about 10 to about 50 relative size percent smaller than the internal diameter of the eductor. The size ratio of the external diameter of the aperture of the eductor liner sleeve member at the upstream end to the length of the sleeve in the process stream direction can be, in embodiments, from about 1:0.5 to about 1:5. The wall thickness of the liner article can be, in embodiments, any reasonable thickness, for example, from about 0.1 millimeter to about 5 centimeters. The liner article is preferably a deformable and resilient material comprised of a thermoset or thermoplastic rubbers or elastomers. In other embodiments, a cylindrically shaped sleeve member is further characterized by a conical or tapered downstream section approaching the end aperture and optional side wall openings.

The present invention provides a method of preventing accumulation or bridging of particulate material educing within an eductor, comprising inserting a flexible eductor liner article in a joint region of the eductor, the eductor liner comprising a flexible, substantially truncated, cylindrical or conical sleeve member with a flange collar member adjacent and perpendicularly attached at an internal edge or surface to the upstream end of said sleeve member, wherein the flange or collar member fixes the liner within the eductor and wherein the accumulation or bridging of particulate material in the eductor is minimized or eliminated. The liner article eliminates or substantially reduces the deposition or accumulation of the educing particulate material at the eductor joint and in the up and downstream vicinities proximate to the liner article. The particle flow rate, composition, and particle size distribution properties of the educing particulate material are maintained at essentially constant levels as measured at regions in the eductor both before and after the liner article location.

The eductor liner article is comprised of a deformable and resilient material, for example, thermoset or thermoelastic rubbers or elastomers, or suitable alternative materials which possess like properties. Suitable and illustrative rubbers and elastomeric materials are defined by ASTM D1566, and include, for example, synthetic natural rubber, styrene butadiene, polybutadiene, butyl rubber, ethylene propylene, neoprene, chlorinated polyethylenes, chlorosulfonated polyethylenes, nitrile rubbers, epichlorohydrin rubber, ethylene acrylic rubbers, perfluoroelastomers, acrylate rubbers, polysulfide, silicone, fluorosilicone, fluorocarbon, urethane, and thermoplastic elastomers such as polyurethanes, polyester copolymers, styrene copolymers, and olefinic copolymers. The deformable and resilient material used for construction of the eductor liner article may further include an internal filler or a surface overcoating for the purposes of achieving improved anti-deposition or anti-fouling performance of the liner article. Suitable fillers or surface coatings include electrically and thermally conductive particles, electrically and thermally conductive fibers, dry lubricants, antistatic compounds, charge control additives, suitably flexible and resilient binder resin or resin blends, and mixtures thereof.

The eductor liner article, or alternatively referred to as a "live wall" liner, may be prepared by a number of known methods including extrusion, thermoforming, injection molding, blow molding, solution coating on, for example, an appropriately shaped mandrel form, slip casting, stamping, solvent welding or gluing of appropriate components and joints, heat shrinking on an appropriate male mandrel form, and the like. The aforementioned filler additives and compliant coatings may be incorporated into or onto the liner article by known and conventional means including extruder melt mixing, rubber milling, spray coating, and the like.

Alternative or modified geometries for the eductor liner article include incorporation of longitudinally, coaxially, or radially oriented tapering, pleats, flutes, or baffles, and which baffles, and the like, and can provide additional rigidity against collapse and may enhance the deformation and recoverability properties of the liner article. The eductor liner article may also include holes or perforations in either the flange collar member or the body or wall of the sleeve member for the purposes of achieving, for example, enhanced fastening of the liner to the eductor, or for enhanced particulate or air stream flow properties within the eductor.

The following Examples are being supplied to further define various species of the present invention, it being noted that these Examples are intended to illustrate and not limit the scope of the present invention. Parts and percentages are by weight unless otherwise indicated. Comparative Examples are also provided.

COMPARATIVE EXAMPLE I

Liner material samples composed of TIVAR 100, an ultra high molecular weight polyethylene available from Poly-Hi, a division of MENSHA Corp., TIVAR 88, stainless steel with a 2B finish, polished aluminum, and glass were fabricated into 1 inch×3 inch flat plates.

The aforementioned liner material samples were individually secured into the openings of a 3 inch diameter wide mouth glass jars. To the jars were added about 10 to 30 percent by volume of a toner composition comprised of resin such as styrene-butadiene, carbon black, a quaternary ammonium charge additive such as dimethyl distearyl ammonium methyl sulfate, reference for example, U.S. Pat. No. 4,937,157. The sealed jars containing the liner samples and toner were roll milled for 1 hour at 97 rpms then examined for toner deposition or accumulation on the glass walls of the jar and on the eductor liner sample material. All of the sample materials failed to prevent deposition of the toner on the jar walls and the liner samples, as determined by visual observation.

COMPARATIVE EXAMPLE II

A metal eductor transport apparatus segment 1 of the same configuration as shown in FIG. 1, having a 6 inch internal diameter and a length of 26 ¼ inches was installed into a metal oxide powder transfer system. After about 1.5 to 2 hours of material transport time, equal to about 495 to 660 pounds of metal oxide, the metal oxide powder had formed a deposit 4 upon the internal walls 2 of the eductor. The large amounts of metal oxide deposit on the walls of the eductor segment had accumulated sufficiently to effectively reduce the internal diameter to less than about one-half its original diameter dimension, thereby significantly obstructing particle flow. This obstruction constrained the production process and resulted in discontinuance of production for the purpose of removal of the metal oxide accumulation.

EXAMPLE I

A metal eductor transport test apparatus 50 of the same configuration, as shown in FIG. 5, with a 6 inch internal diameter and a length of 24 inches was assembled with an eductor liner 20 incorporated therein. The Comparative Example I roll mill procedure was repeated with the exception that the test apparatus 50 was used in place of the aforementioned glass jar with result that no toner cake deposition or accumulation was observed on the liner article 20 nor on the internal walls of the test apparatus.

EXAMPLE II

A metal eductor transport apparatus segment 1 as illustrated in FIG. 3 was fitted with an eductor liner 60 composed of gum rubber as shown in FIG. 6. Illustrative relative liner article dimensions are suggested in FIG. 6. Metal oxide transport was repeated as in Comparative Example II with the result that no obstruction, decreased flow rate, or caking occurred in excess of 650 hours of continuous metal oxide particulate transport and is equal to about 214,500 pounds of material. It is expected that the liner article will provide anti-deposition protection to the eductor segment in excess of about 3 years of continuous operation based upon experience with particulate materials with very low cohesion and adhesion characteristics.

The aforementioned patents and publications are incorporated by reference herein in their entirety.

Other modifications of the present invention may occur to those skilled in the art based upon a review of the present application and these modifications, including equivalents thereof, are intended to be included within the scope of the present invention.

What is claimed is:

1. An eductor liner article comprising: a flexible and substantially cylindrically shaped sleeve member with upstream and downstream ends wherein the sleeve member has at least one side wall opening, and a flange collar member outwardly oriented and integrally and perpendicularly attached at an internal edge surface to the upstream end of said sleeve member, wherein said flange collar member is adapted to anchor the liner within an eductor joint, and wherein the liner eliminates or substantially reduces the deposition and accumulation of particulate material contained in a continuous flow particulate process stream educing through an eductor member in the vicinity of the eductor joint.

2. An article of claim 1 wherein the sleeve member is truncated in the process flow direction so that the aperture of the sleeve member at the upstream end has a larger diameter than the aperture of the sleeve member at the downstream end.

3. An article of claim 2 wherein the apertures of the sleeve member at the upstream and downstream ends are concentric about the longitudinal axis of a cylinder defined by an eductor member cavity in which the liner article is fitted.

4. An article of claim 2 wherein the aperture of the sleeve member at the upstream end is concentric about the axis of a cylinder defined by the eductor member and the aperture of the sleeve at the downstream end is eccentric from the axis defined by the eductor member.

5. An article of claim 2 wherein the external diameter of the aperture of the sleeve member at the upstream end is substantially the same size as the internal diameter of the eductor and wherein, the diameter of the aperture of the sleeve member at the downstream end is from about 10 to 50 percent smaller than the internal diameter of the eductor.

6. An article of claim 2 wherein the size ratio of the external diameter of the aperture of the sleeve member at the upstream end to the length of the sleeve in the process stream direction is from about 1:0.5 to about 1:5.

7. An article of claim 1 wherein the wall thickness of the liner is from about 0.1 millimeters to about 50 millimeters.

8. An article of claim 1 wherein the liner is a deformable and resilient material comprised of a thermoset or thermoplastic rubbers or elastomers.

9. An article of claim 1 wherein the liner is deformable by the action of the particulate process stream, is completely or substantially recoverable upon removal of the action of the particulate process stream, and has high dimensional stability over time.

10. An article of claim 1 wherein the particulate material has a volume average particle size of about 0.01 to about 1,000 microns.

11. An article of claim 1 wherein the particulate material is a toner comprised of an admixture of resin particles, and a colorant.

12. An article of claim 1 wherein the particulate material is selected from the group of particulate and powder materials consisting of pigments, metal oxides, waxes, antistatic compounds, charge control additives, resins and resin blends, and mixtures thereof.

13. An article of claim 1 further comprised of an internal filler or a surface over coating selected from the group consisting of electrically and thermally conductive particles, electrically and thermally conductive fibers, dry lubricants, antistatic compounds, charge control additives, a flexible binder resin or resin blends, and mixtures thereof.

14. An article of claim 1 wherein the particulate material is selected from the group consisting of resin particles, colorant particles, charge additive particles, flow additive particles, wax particles, and mixtures or blends thereof.

* * * * *